United States Patent [19]

Rogers

[11] Patent Number: 4,790,671
[45] Date of Patent: Dec. 13, 1988

[54] SPLIT ROLLER BEARING ASSEMBLY

[75] Inventor: Alfred M. Rogers, Deer Park, N.Y.

[73] Assignee: Thomson Industries, Inc., Port Washington, N.Y.

[21] Appl. No.: 165,840

[22] Filed: Mar. 9, 1988

[51] Int. Cl.[4] ............................................. F16C 29/06
[52] U.S. Cl. ..................................................... 384/44
[58] Field of Search ............................. 384/44, 43, 45; 464/168

[56] References Cited

U.S. PATENT DOCUMENTS 3,194,612  7/1965  Striepe .................................... 384/44
3,398,562  8/1968  Adam ...................................... 384/44

*Primary Examiner*—Lenard A. Footland
*Attorney, Agent, or Firm*—Dilworth & Barrese

[57] ABSTRACT

A split roller bearing assembly includes a bearing body, an endless roller bearing chain mounted on the bearing body, and a plurality of rollers mounted on the chain. The bearing body has a load bearing surface and a return surface which define a path for continuous recirculating movement of the rollers thereabout. The roller bearing chain includes a plurality of pins arranged in a spaced, parallel relationship, and link members connecting the axial ends of adjacent pins together. Each roller is mounted on a corresponding pin of the chain, and is split to define at least two roller components rotatably mounted co-axially to each other on the same pin. Each roller component is rotatable independently of the other roller component of the same pin.

9 Claims, 3 Drawing Sheets

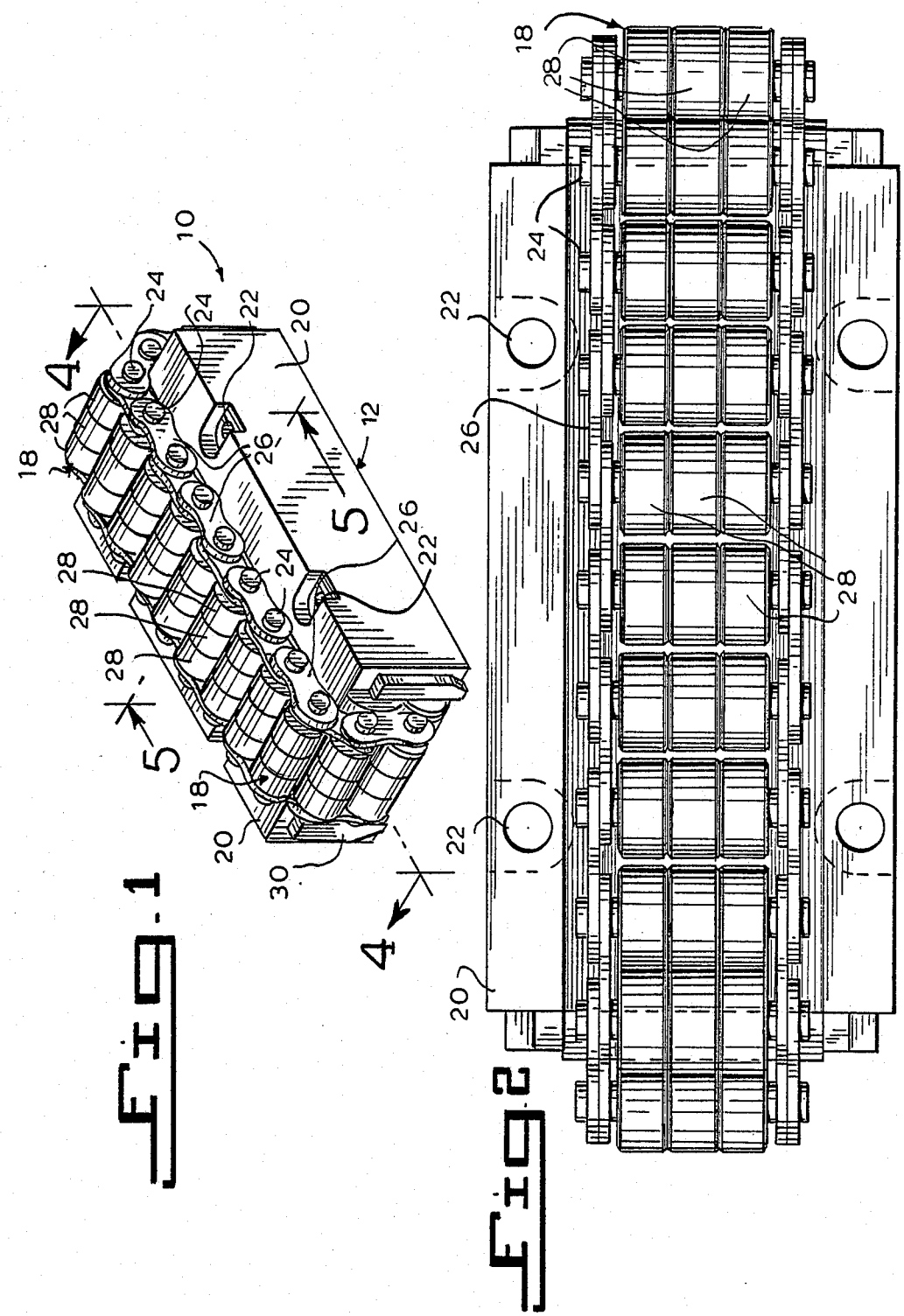

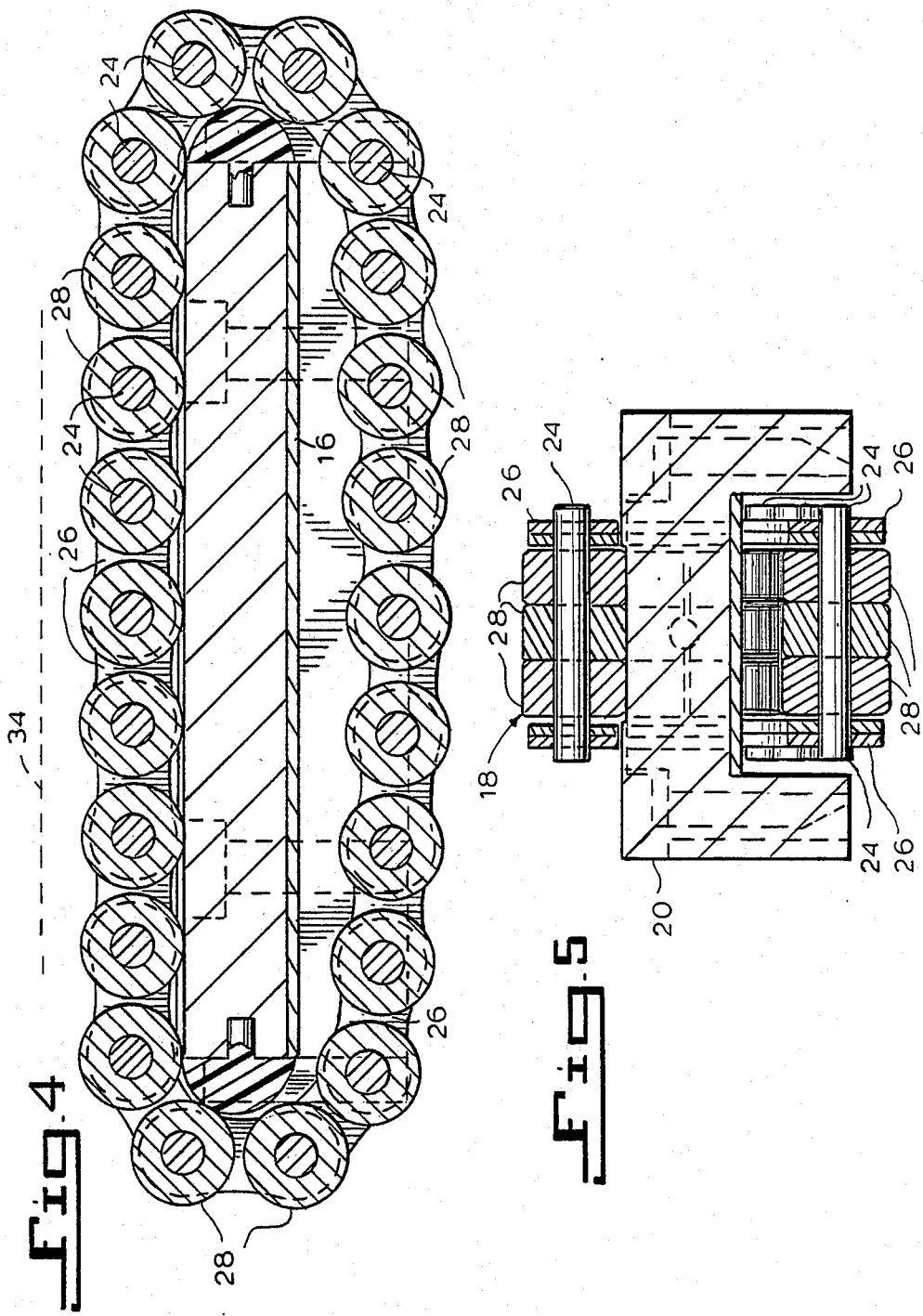

SPLIT ROLLER BEARING ASSEMBLY

BACKGROUND OF THE INVENTION

1. Field Of The Invention

This invention relates to recirculating roller bearing assemblies, and more particularly relates to a linear recirculating roller bearing assembly of the type including a plurality of rollers disposed in a predetermined side-by-side spaced relationship on a chain for rolling recirculating movement along substantially parallel, spaced apart, load bearing and return surfaces.

2. Description Of The Prior Art

A typical chain-type, linear recirculating roller bearing assembly is disclosed in Anderson U.S. Pat. No. 3,111,350. The roller bearing assembly includes a bearing block having a load bearing surface recessed in a linear track or race, and an unloaded surface recessed in a return track. A chain is mounted on the bearing block, and a plurality of cylindrical rollers is mounted on the chain in parallel, side-by-side relationship. The rollers rotate on the chain and recirculate over the linear tracks formed in the block.

One of the major disadvantages of known forms of chain-type linear recirculating roller bearing assemblies, such as the assembly disclosed in the above-identified Anderson patent, is that the rollers have a tendency to skew from their linear track. This is caused chiefly when the rollers return to the working loaded track from the unloaded return track, and the load which they pick up is not distributed evenly over the length of the rollers. Thus, one end of the roller carries a greater load than the other end and causes the less loaded portion to rotate. As a result, the rollers deviate from the linear track and contact the sidewalls of the bearing block defining the raceway, causing wear to the sidewalls and to the rollers.

The rollers will also skew if they have a non-uniform diameter over their axial length. For purposes of explanation, such rollers may be imagined as being formed with a frusto-conical shape. These rollers have a tendency to follow a circular or non-linear path when in rolling motion. Furthermore, a dirt particle picked up by a roller may impede its rolling motion and also cause the roller to skew from its linear track. The force required to return the roller to a proper linear path is considerable. For example, a typical roller can carry a 4,500 lb load distributed over its length. If the coefficient of friction between the roller and the bearing block is typically 0.2, then a static frictional force of 100 lb would have to be overcome to return the roller to its proper linear path.

SUMMARY OF THE INVENTION

Accordingly, it is an object of the present invention to provide a chain-type linear recirculating roller bearing assembly which exhibits a minimum tendency to skew.

It is another object of this invention to provide a roller bearing assembly which requires a reduced force to redirect its rollers onto the proper track.

It is a further object of the present invention to provide a linear recirculating roller bearing assembly which minimizes wear to the bearing block and to the rollers and thus provide a prolonged useful life.

These and other objects are accomplished herein by providing a chain-type, linear recirculating roller bearing assembly which includes a bearing body having a load bearing surface and a return surface which in combination define a path about which rollers continuously recirculate.

An endless roller chain is mounted on the bearing body. The chain includes a plurality of pins which are arranged in a spaced, parallel relationship, and link members connecting the axial ends of adjacent pins together. Thus, the chain, with its interconnected pins and link members, defines a flexible cage for receiving rollers and retaining the rollers in place.

The roller bearing assembly of the present invention includes a plurality of rollers mounted on the chain and disposed about the path in engagement with the bearing body surfaces. Each roller is split into two or more separate roller components. The roller components of each roller are rotatably mounted co-axially to each other on the same pin, and the components of any one roller are rotatable independently of the other components.

Thus, in accordance with the improvements of the present invention, the split roller configuration minimizes the tendency of the rollers to skew. Each component can rotate independently of the other and at its own rate. Thus, any skewing that occurs is primarily limited to one component and has little effect on the entire bearing.

Furthermore, the force required to redirect a skewed roller is substantially reduced from that required for a whole or unsplit roller, such as disclosed in U.S. Pat. No. 3,111,350 to Anderson.

Preferred forms of the split roller bearing assembly, as well as other embodiments, objects, features and advantages of this invention, will be apparent from the following detailed description of the illustrative embodiments thereof, which is to be read in connection with the accompanying drawings.

BRIEF DESCRIPTION OF THE DRAWINGS

FIG. 1 is a top perspective view of the split roller bearing assembly of the present invention.

FIG. 2 is a bottom plan view of the roller bearing assembly shown in FIG. 1.

FIG. 4 is a sectional view of the roller bearing assembly shown in FIG. 1, taken along line 4—4 of FIG. 1.

FIG. 5 is a sectional view of the roller bearing assembly shown in FIG. 1, taken along line 5—5 of FIG. 1.

DETAILED DESCRIPTION OF THE PREFERRED EMBODIMENTS

Figure 3:
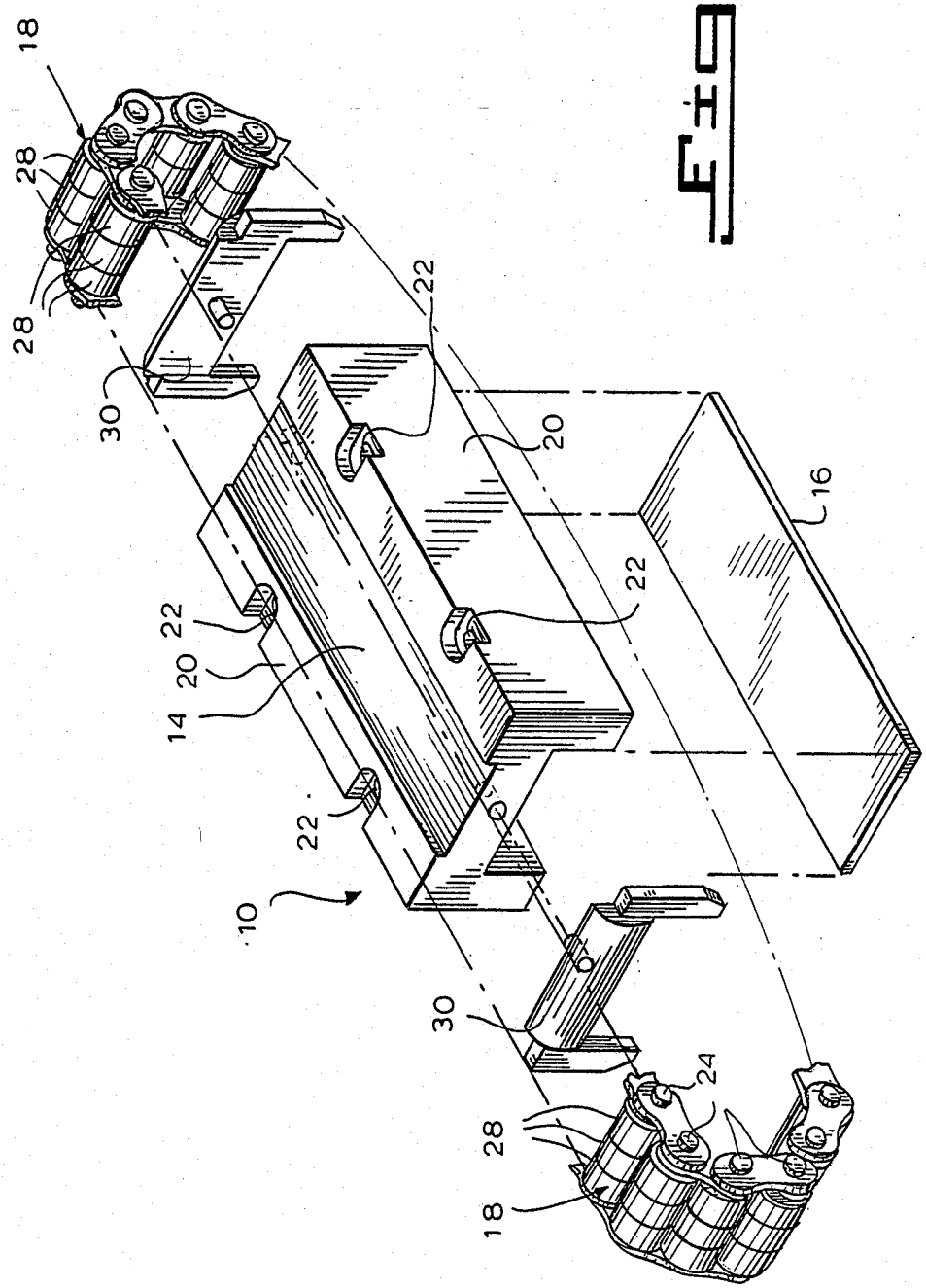
FIG. 3 is an exploded view of the roller bearing assembly of the present invention.

Referring now to FIGS. 1 through 5 of the drawings, the numeral 10 generally indicates a linear recirculating roller bearing assembly constructed in accordance with the subject invention. The assembly comprises an integral bearing body 12 having a load bearing surface 14 (FIG. 3) and a return surface 16 (FIGS. 3 and 4) disposed substantially parallel to each other and defining a path for continuous recirculating movement of a plurality of rollers, indicated generally at 18, thereabout. The bearing body further includes a pair of laterally spaced, substantially parallel sidewalls or flanges 20 straddling the load bearing surface 14 and return surface 16 and extending beyond these surfaces. Thus, the sidewalls define oppositely disposed first and second raceways, each of which is open at opposite ends of the bearing block, with the load bearing surface and return surface being recessed in the first and second raceways, respectively.

The sidewalls 20 are provided with bores 22, for example, for the purpose of securing the assembly to a support element (not shown). The movable element (not shown) is supported by the bearing assembly for linear movement with respect to the plane, indicated by the dotted line at 34 in FIG. 4.

The roller bearing assembly of the present invention further includes an endless roller chain mounted on the bearing body. The roller chain includes a plurality of pins 24 which are arranged in a spaced, parallel relationship. The chain further includes link members 26 connecting the axial ends of adjacent pins together. One of the link members may be removable so that the chain may be disassembled for mounting on the bearing block. Thus, the roller chain, with its interjoined pins 24 and link members 26, defines a flexible roller bearing cage.

The raceways formed in the bearing body are dimensioned so as not to impede the free recirculating movement of the chain and rollers about the bearing body. The first raceway has a depth which is at least less than the diameters of the rollers so that those rollers disposed on the load bearing surface are exposed. Preferably, the first raceway is formed with a width which is slightly greater than the axial lengths of the split rollers, and with a depth such that the upper surface of the sidewalls do not interfere with the link members of the chain, thereby allowing movement of the rollers without interference.

The second raceway is formed with a width which is at least slightly greater than the length of each chain pin, and with a depth which is greater than the diameters of the rollers so that those rollers disposed on the return surface of the body do not extend beyond the lower surface of the sidewalls and do not engage the surface on which the roller bearing assembly is mounted.

A plurality of rollers are rotatably mounted on the pins of the chain, and are disposed about the recirculating path in engagement with the bearing body surfaces. Each roller is split, that is, formed with at least two roller components 28 mounted co-axially to one another on the same pin. Each roller component 28 can rotate on its respective pin independently of the other roller bearing components mounted on the same pin.

In a more preferred form, the roller bearing assembly of the present invention further includes first and second end pieces 30 which are mounted on opposite ends of the bearing body. The end pieces 30 have rounded surfaces which are disposed between and interconnect the load bearing and return surfaces of the bearing body. The rounded surfaces of the end pieces thus bridge the open ends of the first and second raceways and provide a smooth transition between the load bearing and return surfaces. Preferably, the end pieces are formed from a plastic material which minimizes friction, such as DELRIN, available from E. I. duPont. However, said end pieces may be formed of metal, such as steel. Furthermore, rather than being distinct components mounted on the bearing body, said end pieces 30 can be an integral part of the bearing body.

The return surface of the roller bearing assembly may be an integral part of the bearing body or may comprise a sheet or coating formed from a plastic anti-friction material, such as DELRIN. The sheet or coating is secured directly onto the bearing body to form the return surface 16 so that the rollers experience little or no friction as they pass through the second raceway.

The split roller bearing assembly of the present invention minimizes the effects of skewing of any one roller. A dirt particle will effect primarily only one of the roller components 28, leaving the other components 28 mounted on the same chain pin free to rotate. Also, if one of the roller components 28 is formed with an irregular surface or with a diameter which varies slightly from the diameters of the other components 28, and thus tends to rotate at a different speed, the other components mounted on the same chain pin will not be effected.

As stated hereinbefore, the split rollers of the present bearing assembly require less force to correct skewing than that required in an assembly having integral or unsplit roller bearings, such as disclosed in U.S. Pat. No. 3,111,350.

Additionally, each roller component is free to take up its load independently of the other components mounted co-axially on the same chain pin as the roller bearing returns to the working, loaded track from the unloaded, return track. Thus, each roller component can rotate at its own rate independently of the other components, and will have little skewing affect on the entire roller bearing.

Because less force is needed to correct skewing, and because less skewing occurs with the split roller bearing configuration of the present assembly, the chain and rollers are less likely to engage the sidewalls defining the first and second raceways of the bearing body. Consequently, the components of the assembly wear less, thus prolonging the useful life of the assembly.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A linear recirculating roller bearing assembly, which comprises:
    a bearing body having a load bearing surface and a return surface defining a path for continuous recirculating movement of rollers thereabout;
    an endless roller chain mounted on the bearing body, the roller chain including a plurality of pins arranged in a spaced, parallel relationship, and link members connecting the axial ends of adjacent pins together; and
    means to minimize skewing include a plurality of rollers mounted on the chain and disposed about the path in engagement with the bearing body surfaces, each roller being mounted on a corresponding pin of the chain and including at least two roller components rotatably mounted on the same pin co-axially to each other, each roller component being rotatable independently of the other components on the same pin.

2. A linear recirculating roller bearing assembly as defined by claim 1, wherein the bearing body includes a pair of laterally spaced, substantially parallel sidewalls straddling the load bearing surface and the return surface and defining opposite first and second raceways for receiving the roller chain and rollers, the load bearing surface and return surface being recessed in the first and second raceways, respectively.

3. A roller bearing assembly as defined by claim 2, wherein the first raceway is formed with a depth which is less than the diameters of the rollers, and the second raceway is formed with a depth which is greater than the diameters of the rollers.

4. A roller bearing assembly as defined by claim 3, wherein the second raceway is formed with a width which is at least slightly greater than the length of each chain pin.

5. A roller bearing assembly as defined by claim 3, wherein the first raceway is formed with a width which is at least slightly greater than the length of each roller.

6. A roller bearing assembly as defined by claim 3, wherein the first raceway is formed with a depth which is less than the diameter of the rollers and with a depth such that the link members of the chain do not interfere with the movement of the rollers.

7. A roller bearing assembly as defined by claim 2, wherein the load bearing and return surfaces extend between opposite ends of the bearing body in their respective raceway, and wherein the assembly further includes end pieces on the opposite ends of the bearing body, the end pieces having rounded surfaces disposed between and interconnecting the load bearing and return surfaces.

8. A roller bearing assembly as defined by claim 7, wherein the end pieces are made from a plastic material.

9. A roller bearing assembly as defined by claim 3, wherein the return surface of the bearing body is formed from a plastic material.

* * * * *

UNITED STATES PATENT AND TRADEMARK OFFICE
CERTIFICATE OF CORRECTION

PATENT NO. : 4,790,671

DATED : December 13, 1988

INVENTOR(S) : Alfred M. Rogers

Page 1 of 2

It is certified that error appears in the above-identified patent and that said Letters Patent is hereby corrected as shown below:

On the first page of the patent, under "References Cited U.S. Patent Documents" and immediately under "3,398,562 8/1968 Adam . . . . . . . . . . . . . . . . 384/44"

the following should appear:

-- 3,111,350 11/1963 Anderson
3,058,788 10/1962 Kaplan
1,080,288 12/1913 Lockwood
2,723,886 11/1955 Warshaw
3,000,674 9/1961 Ford
4,561,703 12/1985 Dabringhaus
4,496,195 1/1985 Kwon et al.
3,241,890 3/1966 Stallman
4,486,054 12/1984 Oetjen et al.
3,003,828 10/1961 Stark Foreign Patent Documents

WO 8102919 10/1981 PCT/US81/00319 --

UNITED STATES PATENT AND TRADEMARK OFFICE
CERTIFICATE OF CORRECTION

PATENT NO. : 4,790,671
DATED : December 13, 1988
INVENTOR(S) : Alfred M. Rogers

Page 2 of 2

It is certified that error appears in the above-identified patent and that said Letters Patent is hereby corrected as shown below:

Column 1, Line 51,     at the end of the line delete the "," which appears;

Column 4, Line 52,     "include" should read --including--;

Column 6, Line 13,     "claim 3" should read --claim 1--;

Signed and Sealed this

Twenty-third Day of May, 1989

Attest:

DONALD J. QUIGG

*Attesting Officer*      *Commissioner of Patents and Trademarks*